United States Patent
Lee et al.

(10) Patent No.: US 7,215,892 B2
(45) Date of Patent: May 8, 2007

(54) DUOBINARY OPTICAL TRANSMITTER

(75) Inventors: Han-Lim Lee, Seoul (KR); Seong-Taek Hwang, Pyongtaek-shi (KR); Hee-Won Cheung, Seoul (KR); Yun-Je Oh, Yongin-shi (KR); Ji-Chai Jeong, Seoul (KR); Byung-Chang Kang, Yongin-shi (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 662 days.

(21) Appl. No.: 10/638,814

(22) Filed: Aug. 11, 2003

(65) Prior Publication Data
US 2004/0071473 A1 Apr. 15, 2004

(30) Foreign Application Priority Data
Oct. 11, 2002 (KR) .................. 10-2002-0062162

(51) Int. Cl.
*H04B 10/04* (2006.01)
(52) U.S. Cl. .................................. 398/183; 398/186
(58) Field of Classification Search ............... 398/182, 398/183, 135, 186
See application file for complete search history.

(56) References Cited
U.S. PATENT DOCUMENTS
6,865,348 B2 * 3/2005 Miyamoto et al. .......... 398/183
2002/0033984 A1 * 3/2002 Yonenaga et al. .......... 359/180

FOREIGN PATENT DOCUMENTS
| EP | 0825733 A2 | 2/1998 |
| EP | 1128580 A2 | 8/2001 |
| EP | 1185006 A2 | 3/2002 |
| JP | 2002-077059 | 3/2002 |

OTHER PUBLICATIONS

A.J. Price et al.; "210 km Repeaterless 10 Gb/s Transmission Experiment Through Nondispersion-Shifted Fiber Using Partial Response Scheme;" Oct. 7, 1995; 3 pages.

* cited by examiner

*Primary Examiner*—David C. Payne
(74) *Attorney, Agent, or Firm*—Cha & Reiter, L.L.C.

(57) ABSTRACT

Disclosed is a duobinary optical transmitter, which includes a laser source for outputting light with a predetermined wavelength; a Mach-Zehnder interferometer-type optical intensity modulator for modulating the intensity of the light according to a three-level data signal inputted through a modulation terminal; a low-pass filter for converting an inputted two-level binary data signal into a three-level data signal through an interference among codes; and, a modulator driver/amplifier for amplifying the three-level data signal and then outputting it to the modulation terminal, wherein the overall bandwidth of the low-pass filter, the modulator driver/amplifier, and the optical intensity modulator corresponds to approximately ¼ of the clock frequency of the two-level binary data signal.

5 Claims, 6 Drawing Sheets

DUOBINARY OPTICAL TRANSMITTER

CLAIM OF PRIORITY

This application claims priority to an application entitled "duobinary optical transmitter," filed with the Korean Intellectual Property Office on Oct. 11, 2002 and assigned Serial No. 2002-62162, the contents of which are hereby incorporated by reference.

BACKGROUND OF THE INVENTION

1. Field of the Invention

The present invention relates to an optical communication system and, more particularly to an optical transmitter for generating optical signals.

2. Description of the Related Art

Optical communication systems utilizing a Dense-Wavelength-Division-Multiplexing (DWDM) scheme have an excellent communication efficiency as they permit the transmission optical signals of multiple channels with different wavelengths through a single optical fiber. The DWDM systems can also transmit optical signals having different transmission speeds. As such, the DWDM are now widely used in ultra-high speed Internet networks, and systems capable of transmitting more than a hundred channels through a single optical fiber, using the DWDM technology, are in common use. Various research efforts have been focused recently to develop a system that is capable of simultaneous transmission of more than two hundred channels of 40 Gbps through a single optical fiber at a transmission speed of more than 10 Tbps.

In order to cope with a rapidly-increased demand in data traffic, there has been much improvement in the wavelength division multiplexing technology. Today, the bandwidth of an Erbium-Doped-Fiber-Amplifier (EDFA) is approaching its limit which is based on the intensity modulation technology used commonly in the art. Therefore, a new technology other than EDFA is needed in the near future to meet the steady increase in data traffic. As an approach to increase the transmission capacity of the DWDM system, "duobinary" transmission technology has emerged to improve the bit spectral efficiency by utilizing the limited bands of the optical fibers efficiently.

FIG. 1 shows a configuration of a conventional duobinary optical transmitter. The transmitter comprises first and second low-pass filters 120 and 150; first and second modulator driver/amplifier 130 and 160; a laser source 170; and, a Mach-Zehnder interferometer-type optical intensity modulator 180.

In operation, a two-level binary data signal is inputted to the first low-pass filter 120. The first low-pass filter 120 has a bandwidth corresponding to about ¼ of the clock frequency of the two-level binary signal. Due to an excessive limitation on the bandwidth, an interference among codes is generated. This causes a conversion of the two-level binary signal into a three-level data signal. As such, the three-level signal is inputted to the first modulator driver 130. Then, the first modulator driver 130 amplifies the three-level signal and outputs it to the optical intensity modulator 180. The first modulator driver 130 and the optical intensity modulator 180 both have a bandwidth corresponding to a clock frequency of the two-level binary signal. Similarly, a binary inverted data signal is also converted into a three-level inverted data signal through the second low-pass filter 150 during the operation. This three-level inverted signal is amplified through the second modulator driver 160 and then inputted to the optical intensity modulator 180. Lastly, the laser source 170 outputs light with a predetermined wavelength, and the optical intensity modulator 180 modulates the light according to the three-level signals and outputs them for a subsequent transmission.

Note that the first low-pass filter 120 and the first modulator driver 130 constitute a first arm 110 relative to the optical intensity modulator 180, and the second low-pass filter 150 and the second modulator driver 160 constitute a second arm 140 relative to the optical intensity modulator 180. The first and second arms 110 and 140 are connected to the first and second modulation terminals (RF+ and RF−) of the optical intensity modulator 180, respectively.

However, in the duobinary optical transmitter as shown in FIG. 1, only a low-pass filter has a bandwidth corresponding to ¼ of the clock frequency of the two-level binary signal. The remaining modulator driver and optical intensity modulator both have a bandwidth corresponding to a clock frequency of the two-level binary signal and tend to be expensive to implement. Accordingly, the conventional transmitter has a drawback in that using devices of high bandwidth increases the manufacturing cost of the entire optical transmitter, and therefore the cost competitiveness of the optical transmitter is weakened.

Therefore, there is a need for an optical transmitter that may be realized in a simple, reliable, and inexpensive implementation.

SUMMARY OF THE INVENTION

One aspect of the present invention is to provide a duobinary optical transmitter capable of allowing improved cost competitiveness by using components having a lower bandwidth.

Another aspect of the invention is to provide a duobinary optical transmitter, comprising: a laser source outputting light with a predetermined wavelength; a Mach-Zehnder interferometer-type optical intensity modulator modulating the intensity of the light according to a three-level data signal inputted through a modulation terminal; a low-pass filter converting an inputted two-level binary data signal into a three-level data signal through an interference among codes; and, a modulator driver/amplifier for amplifying the three-level data signal and outputting the amplified output signal to the modulation terminal, wherein an overall band width of the low-pass filter, the modulator driver/amplifier, and the optical intensity modulator corresponds to approximately ¼ of the clock frequency of the two-level binary data signal.

BRIEF DESCRIPTION OF THE DRAWINGS

The above and features and advantages of the present invention will be more apparent from the following detailed description taken in conjunction with the accompanying drawings, in which.

DETAILED DESCRIPTION OF THE PREFERRED EMBODIMENT

Hereinafter, duobinary optical transmitters according to preferred embodiments of the present invention will be described with reference to the accompanying drawings. For the purposes of clarity and simplicity, a detailed description of known functions and configurations incorporated herein will be omitted as it may make the subject matter of the present invention unclear.

Figure 1:
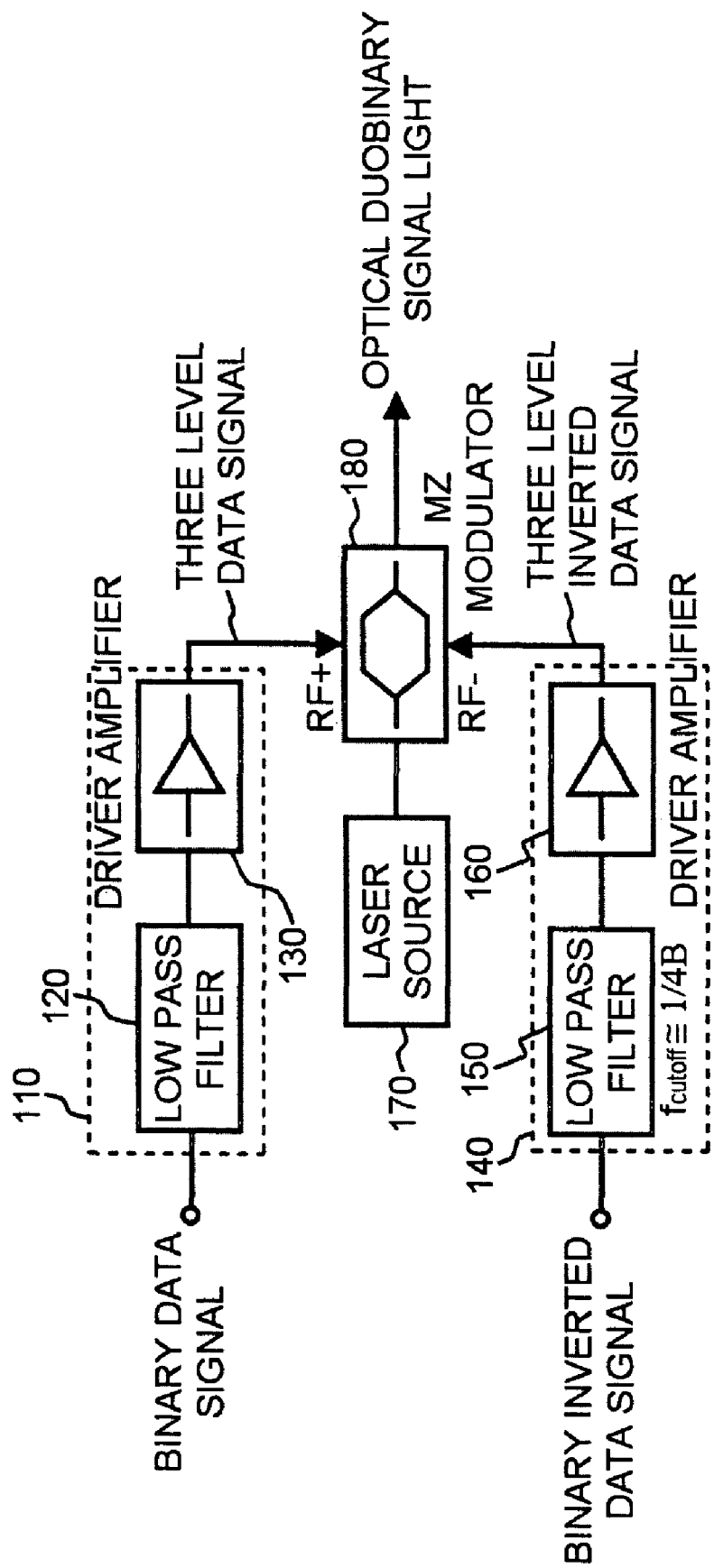
FIG. 1 shows a configuration of a conventional duobinary optical transmitter.
Figure 2:
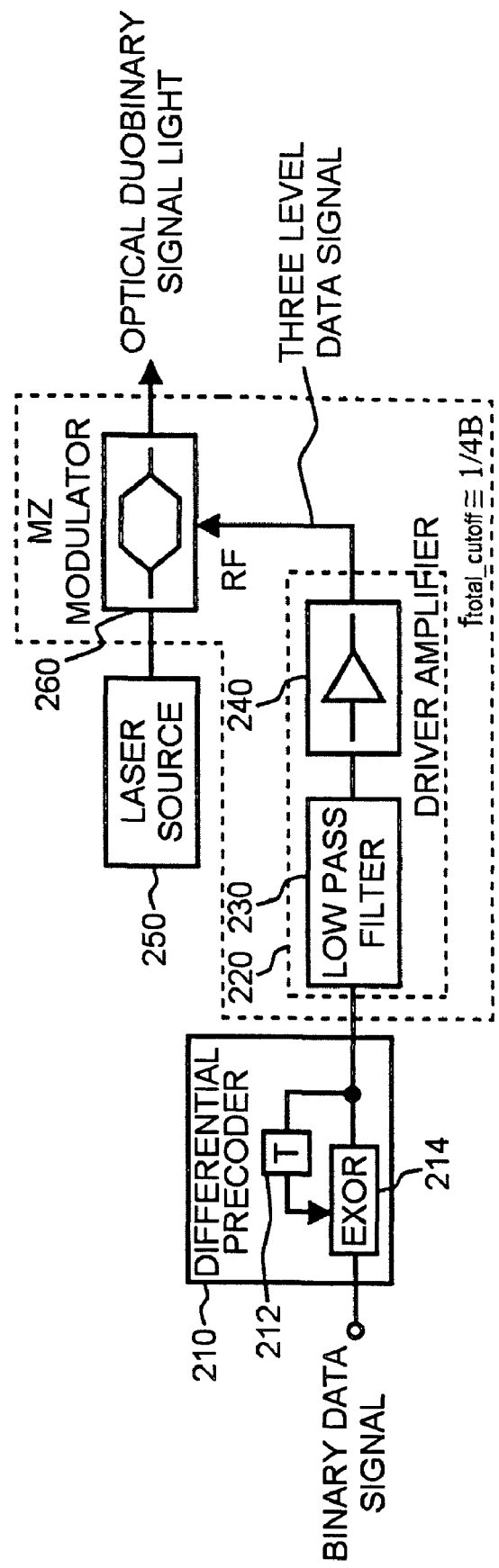
FIG. 2 shows a configuration of a duobinary optical transmitter according to an embodiment of the present invention.

FIG. 2 shows the configuration of a duobinary optical transmitter according to the embodiment of the present invention. The inventive transmitter includes a differential precoder 210; a low-pass filter 230; a modulator driver/amplifier 240; a laser source 250; and, a Mach-Zehnder interferometer-type optical intensity modulator 260. The low-pass filter 230 and the modulator driver 240 constitute an arm 220, which is in turn connected to a modulation terminal (RF) of the optical intensity modulator 260.

The differential precoder 210 comprises a one-bit delay line 212 and an EXOR (Exclusive OR) circuit 214. The differential precoder 210 converts an input two-level binary data signal into a precoded two-level binary signal. Note that, at the receiver side, the differential precoder can be used to perform the reverse function of the low-pass filter 230, thus enabling a duobinary transmission/reception mode without changing any receiver.

It should be noted that although one example has been given to illustrate the configuration of the differential precoder 210, the differential precoder 210 can be configured in various ways known to those skilled in the art to perform the same precoding function. For an example, the differential precoder 210 can be comprised of a binary counter and a delay counter. In this case, the binary counter counts the input clock signals when an input two-level binary signal has a predetermined valve ("0" or "1") and then outputs the result.

In operation, the low-pass filter 230 converts the precoded two-level binary data signal into a three-level data signal through an inter-symbol interference among the pulse patterns caused by the limitation in the bandwidths. The modulator driver 240 amplifies the three-level signal and outputs it to the modulation terminal (RF).

Meanwhile, the laser source 250 outputs light with a predetermined wavelength. The optical intensity modulator 260 modulates the intensity of the light according to a three-level data signal inputted through its modulation terminal (RF) and outputs the modulated light. In the embodiment, the overall bandwidth of the low-pass filter 230, the modulator driver 240, and the optical intensity modulator 260 corresponds to approximately ¼ of the clock frequency of the two-level binary signal. Preferably, the bandwidth of the optical intensity modulator 260 corresponds to approximately ⅖ or ⅘ of the clock frequency of the two-level binary signal.

The principle of the present invention is based on a fact that a spectrum type in a frequency domain determines the quality of two-level binary data signal. Accordingly, in order to help understand the present invention, such frequency characteristics will now be considered.

Figure 3:
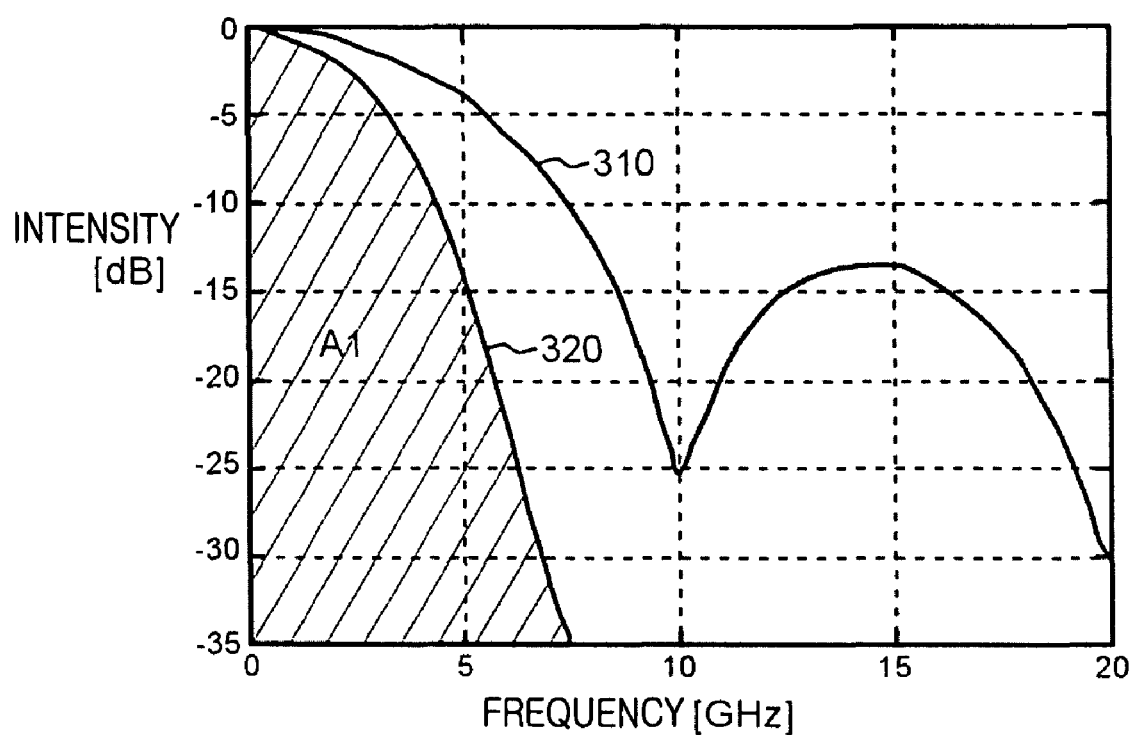
FIG. 3. shows the frequency characteristics of a binary NRZ signal and a duobinary NRZ signal.

FIG. 3 shows the frequency characteristics of a binary NRZ (Non-Return-to-Zero) signal and a duobinary NRZ signal. There are illustrated frequency-intensity curves 310 and 320 of the binary NRZ signal and the duobinary NRZ signal, respectively.

The binary NRZ signal can have any transmission rate, such as 10 Gbps, 20 Gbps, 40 Gbps, 80 Gbps, 160 Gpbs, etc. However, here it is assumed that the binary NRZ signal has a transmission rate of 10 Gbps, for clarity and simplicity of the description. In the prior art, a modulator driver and an optical intensity modulator having a bandwidth of 10 GHz, corresponding to the transmission rate of the binary NRZ signal, have been used, as mentioned above. This, of course, weakens the cost competitiveness of the entire optical transmitter.

In contrast, in generating the duobinary signal, the overall bandwidth of the low-pass filter 230, the modulator driver 240, and the optical intensity modulator 260 has a crucial impact on the quality of the duobinary signal. Graphically, if the overall spectrum of the optical intensity modulator 260 and the components 230 and 240, constituting the arm 220, can meet the desired form of the shaded area A1 as in FIG. 3, any characteristic required for optical communication can be obtained. In such a scenario, it is not necessary to require that all components have high bandwidths. Accordingly, if the overall bandwidth of the low-pass filter 230, the modulator driver 240, and the optical intensity modulator 260 corresponds to approximately ¼ of the clock frequency of the two-level binary signal, i.e., 2.5 GHz, all characteristics required for optical communication are satisfied because the frequency information of the duobinary signal is not distorted.

In the case of an existing modulator driver 240, not only a gain but also a group speed delay are import parameters. Accordingly, the present invention employs devices with a bandwidth of 10 GHz.

Figure 4:
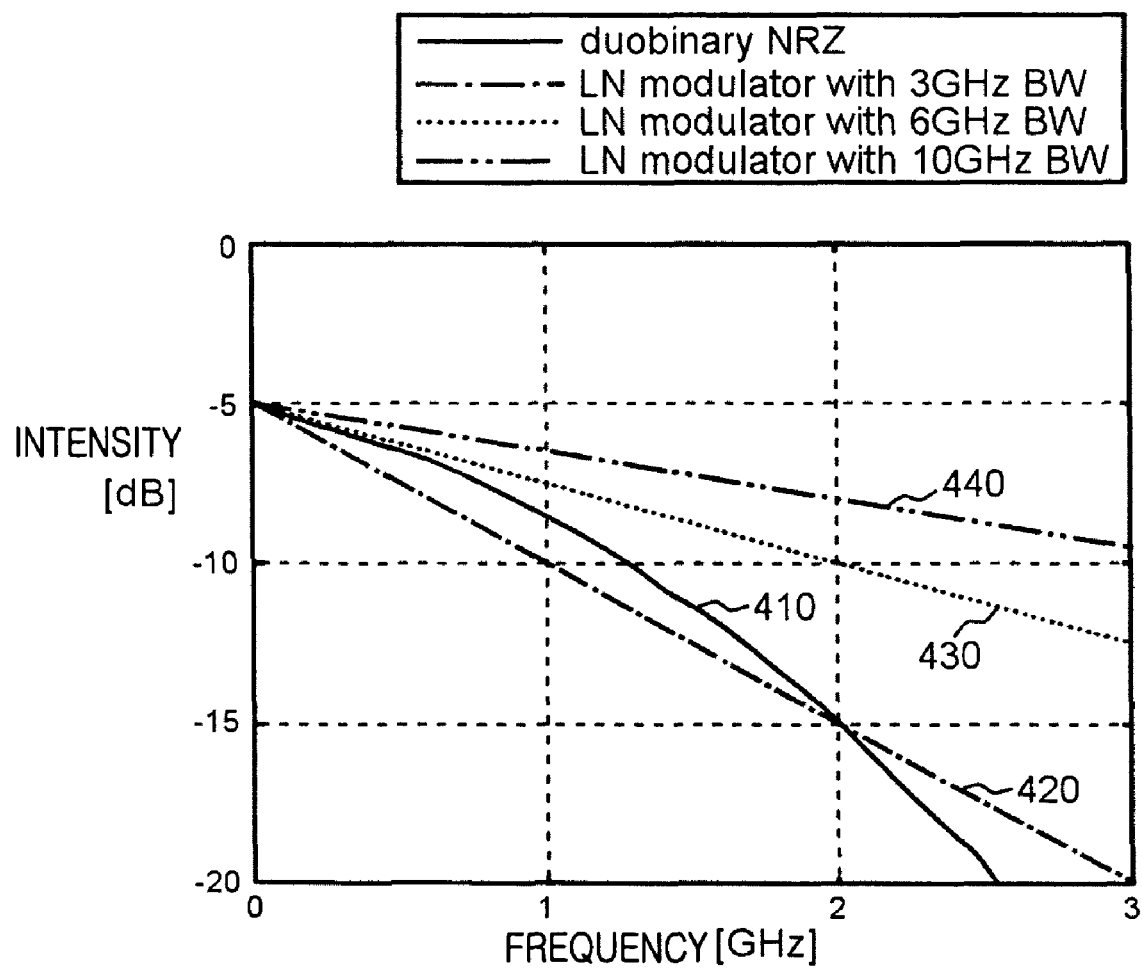
FIG. 4. shows the frequency characteristics of optical intensity modulators with various bandwidths.

FIG. 4 shows the frequency characteristics of optical intensity modulators with various bandwidths. There are illustrated frequency-intensity curves 420, 430, and 440 of optical intensity modulators having band widths of 3 GHz, 6 GHz, and 10 GHz, respectively, as well as a frequency-intensity curve 410 of a duobinary NRZ signal. In the case of the curve 430 of the optical intensity modulator having a band width of 6 GHz, its frequency characteristic is better than that of the duobinary signal. Accordingly, a duobinary optical modulation is possible without any distortion of signals. In this case, a duobinary signal can be generated by increasing the bandwidth of the low-pass filter. Meanwhile, the optical intensity modulator with a bandwidth of 3 GHz has a frequency characteristic worse than that of the duobinary signal. This makes it impossible to perform a duobinary optical modulation without having distortions in the signals. These results can be verified more accurately by measuring an eye diagram, as explained hereinafter.

Figure 5:
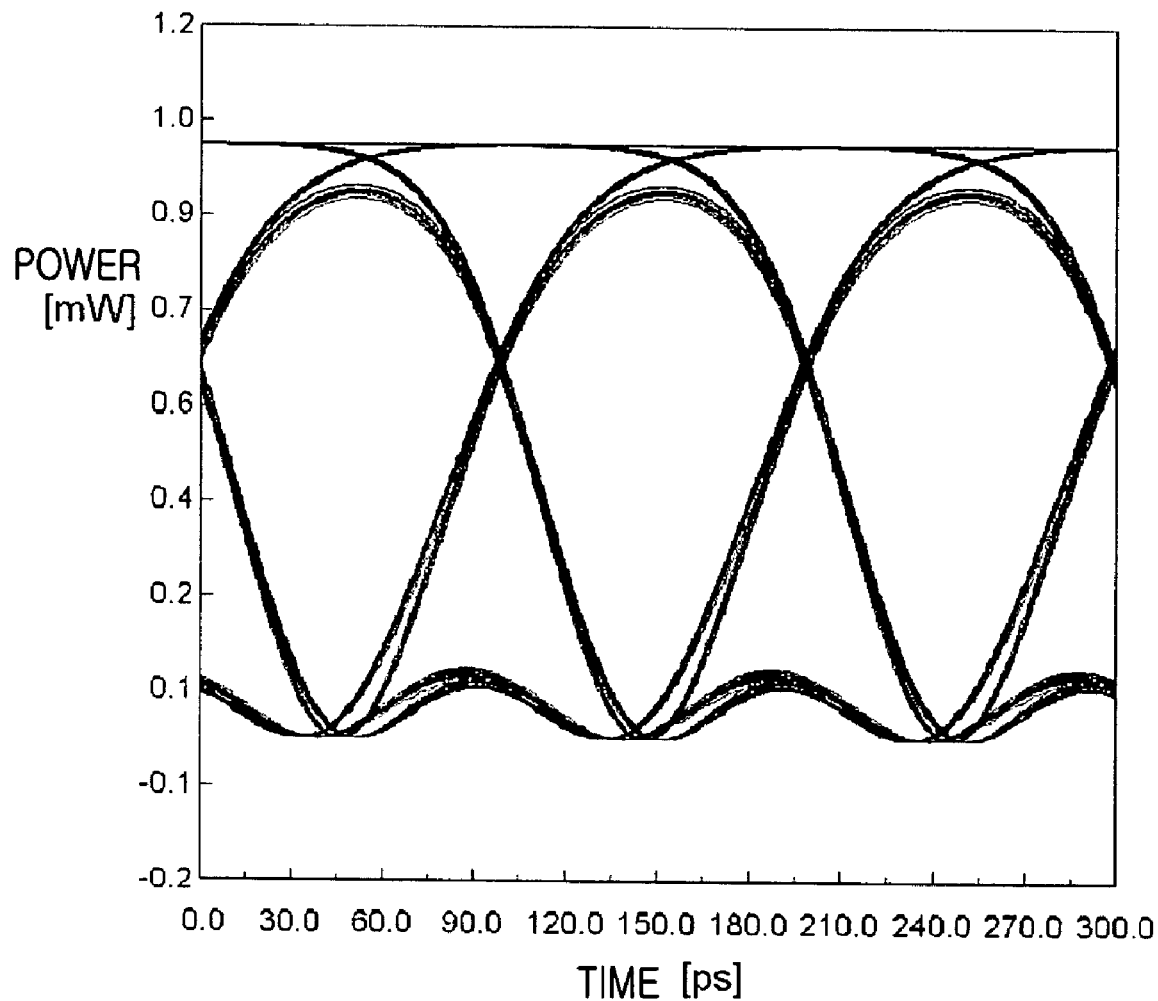
FIG. 5. shows an eye diagram of a conventional duobinary optical transmitter; and, FIG. 6. shows an eye diagram of a duobinary optical transmitter according to the present invention.
Figure 6:
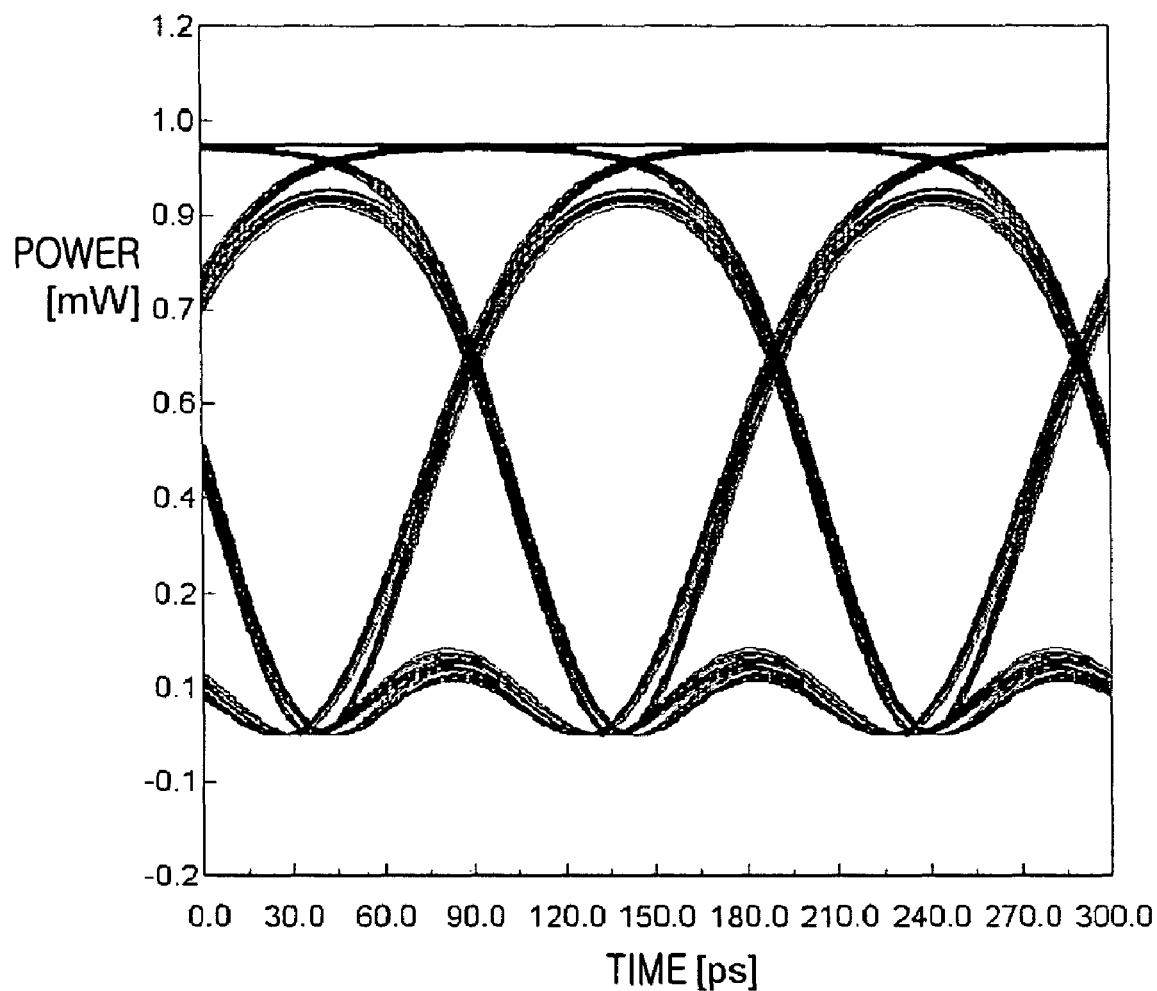

FIG. 5. illustrate an eye diagram of a conventional duobinary optical transmitter, and FIG. 6. illustrate an eye diagram of a duobinary optical transmitter according to the present invention. In particular, FIG. 5 represents an eye diagram obtained by using an optical intensity modulator with a bandwidth of 10 GHz and a low-pass filter with a bandwidth of 2.6 GHz. Similarly, FIG. 6 represents an eye diagram obtained by using an optical intensity modulator with a bandwidth of 6 GHz and a low-pass filter with a bandwidth of 2.8 GHz. The characteristics of these eye diagrams show a little difference. Therefore, an optical intensity modulator with a bandwidth of 10 GHz and a low-pass filter with a band width of 2.6 GHz can be replaced with an optical intensity modulator with a bandwidth of 4.5–6 GHz and a low-pass filter whose bandwidth has increased comparatively little. Note that an optical intensity modulator with a band width of 4.5–6 GHz can be manufactured by modifying an optical intensity modulator with a band width of 2.5 GHz. Accordingly, compared with an optical intensity modulator with a band width of 10 GHz, the cost reduction of 30–40% can be obtained.

If the overall bandwidth of the low-pass filter 230, the modulator driver 240, and the optical intensity modulator 260 corresponds to approximately ¼ of the clock frequency of a desired two-level binary signal, the two-level binary signal can be generated. In particular, when a binary NRZ signal has a transmission rate of 10 Gbps, an optical intensity modulator with a bandwidth of 10 GHz has been used in a conventional duobinary optical transmitter, and the optical intensity modulator can be replaced with an optical intensity modulator with the bandwidth of 4.5–6 GHz according to the present invention. As a result, duobinary optical transmitters according to the present invention have a superior advantage in cost competitiveness.

The present invention has been described as above with reference to a Mach-Zehnder interferometer-type optical intensity modulator having a single arm configuration, as shown in FIG. 2. However, it should be noted that the present invention can also be applied to a Mach-Zehnder interferometer-type optical intensity modulator having a two arm configuration. In the case of the latter, if the overall bandwidth of a low-pass filter, a modulator driver, constituting a first arm, and the modulator corresponds to ¼ of a clock frequency of a two-level binary signal, and at the same time, the overall band width of a low-pass filter, a modulator driver, constituting a second arm, and a modulator also corresponds to ¼ of the clock frequency of a two-level binary signal, then any characteristics required for optical communication can be satisfied.

As explained above, duobinary optical transmitters according to the present invention have an advantage in that cost competitiveness can be improved by using components with low band widths as the overall bandwidth of the components can be set to ¼ of a clock frequency of a two-level binary signal.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A duobinary optical transmitter comprising:
    a low-pass filter for converting an input two-level binary data signal into a three-level data signal through an interference process;
    an amplifier for amplifying the three-level data signal;
    a laser source for outputting light having a predetermined wavelength; and,
    an optical intensity modulator for modulating the intensity of the light according to a three-level data signal outputted from the amplifier,
    wherein an overall band width of the low-pass filter, the amplifier, and the optical intensity modulator substantially corresponds to ¼ of the clock frequency of the two-level binary data signal.

2. The duobinary optical transmitter according to claim 1, further comprising a differential precoder coupled to the low pass filter for precoding the input two-level binary signal.

3. The duobinary optical transmitter according to claim 1, wherein the band width of the optical intensity modulator substantially corresponds to ⅖ or ⅘ of a clock frequency of the two-level binary signal.

4. The duobinary optical transmitter according to claim 1, wherein the optical intensity modulator comprises an Mach-Zehnder interferometer-type modulator.

5. The duobinary optical transmitter according to claim 2, wherein the bandwidth of the optical intensity modulator substantially corresponds to ⅖ or ⅘ of a clock frequency of the two-level binary signal.

* * * * *